(12) United States Patent
Sokolowski et al.

(10) Patent No.: US 8,155,516 B2
(45) Date of Patent: Apr. 10, 2012

(54) APPARATUS AND METHOD FOR ENSURING CONTINUITY OF FIBER OPTIC

(75) Inventors: Edward Sokolowski, Kanata (CA); Bharat Dave, Howell, NJ (US); Paul Grabbe, Tinton Falls, NJ (US); Murali Sampath, Princeton, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 394 days.

(21) Appl. No.: 12/435,482

(22) Filed: May 5, 2009

(65) Prior Publication Data

US 2010/0284688 A1 Nov. 11, 2010

(51) Int. Cl.
*G02F 1/00* (2006.01)
(52) U.S. Cl. .................. 398/5; 398/8; 398/2; 398/1
(58) Field of Classification Search .................. 398/5, 8, 398/2, 1
See application file for complete search history.

(56) References Cited

U.S. PATENT DOCUMENTS

| 2002/0131103 A1* | 9/2002 | Bambos | 359/118 |
| 2006/0251115 A1* | 11/2006 | Haque et al. | 370/466 |
| 2007/0201873 A1* | 8/2007 | Buabbud et al. | 398/66 |

* cited by examiner

*Primary Examiner* — Kinam Park
(74) *Attorney, Agent, or Firm* — Sorin Royer Cooper LLC

(57) ABSTRACT

In a fiber-optic communications system, a backup or redundant optical link is provided at the central office in parallel with the primary one in use. Parameters associated with the backup link, including its signal delay, its attenuation, etc. are stored at the time of installation. Upon failure of the primary link, switchover can be automatic, and the stored parameters are used to make adjustments necessary for the differences between the primary link and the backup link. In addition, having information on the differences between the two links, the central office is able to send control information downstream which is used at the remote site to control changes that must be made for upstream signals. For example, customer equipment can be signaled to adjust its timing for the next time slot or interface amplifiers can be adjusted to account for the change in attenuation. The central office could be provided with a corrected interface to accommodate the new link and a substantial buffer to account for the change in timing, and switchover to the new timing could be done gracefully.

20 Claims, 3 Drawing Sheets

APPARATUS AND METHOD FOR ENSURING CONTINUITY OF FIBER OPTIC

BACKGROUND OF THE INVENTION

The present invention relates generally to fiber-optic communications systems and more particularly, concerns an apparatus and method for ensuring continuity of communications upon the failure of a fiber-optic link.

Fiber-optic communications is gaining popularity, and an increasing number of locations are now able to enjoy the benefits of such communications. Increasingly, fiber-optic links are being provided from a central office to a customer's property. In some instances, a direct fiber is provided between a central office and the customer, but more often, each fiber leaving the central office is shared by many customers. This can be done through an active optical network (AON) or a passive optical network (PON). In an AON, the central office and the customers are connected through a network via active components, typically an Ethernet network, and in a PON communications downstream from the central office to the customers are provided via an optical splitter with encryption while upstream communications from customers are combined using a multiple access protocol, such as time division multiple access (TDMA). For example, the FiOS fiber-optic network service available from Verizon Communications utilizes a PON.

Thus, at least for certain optical links, there is a need for transmitting timing for TDMA, encryption keys, power level, error correction codes and signals associated with networking. When a fiber optic link at the central office fails, it is a common practice to simply replace the link by switching over to a new fiber-optic link. During the replacement, communications are interrupted. When the link is replaced, the system goes through an adaptation phase during which all the communication equipment adjusts to the new link. Then, there is also a delay as various electronic interactions take place to restore synchronization, timing, error correction and proper encryption. As the signals traverse through plural network elements, the delay is accumulated and gets worse.

Upon failure of an optical link, it would be desirable to provide a graceful switchover to an operational optical link, so as to minimize and, preferably eliminate, loss of continuity of communications.

SUMMARY OF THE INVENTION

In accordance with one aspect of the present invention, a backup or redundant optical link is provided between a central office and a remote site in parallel with the primary one in use. Parameters associated with the backup link, including its signal propagation delay, its attenuation, etc. are calculated in advance and stored at the time of installation. Upon failure of the primary link, switchover can be automatic, and the stored parameters are used to make adjustments necessary for the differences between the primary link and the backup link. In addition, having information on the differences between the two links, the central office is able to send control information downstream which is used at the remote equipment to control changes that must be made for upstream signals. For example, customer equipment can be signaled to adjust its timing for the next time slot or adjust the signal transmission level to account for the change in attenuation. The central office could be provided with a corrected interface to accommodate the new link and a substantial buffer to account for the change in timing, and switchover to the new timing could be done gracefully.

It is contemplated that the invention can permit switchover sufficiently quickly to avoid loss of continuity of communications. That is, it should be possible to continue communications during the switchover as a result of the automatic interface adjustment, the local buffering adjustment, and the changes effected by the remote equipment in real time, or nearly real time, in response to the control information sent downstream.

BRIEF DESCRIPTION OF THE DRAWINGS

The foregoing and further objects, features and advantages of the present invention will be understood more completely from the following detailed description of a presently preferred, but nonetheless illustrative, embodiment in accordance with the present invention, with reference being had to the accompanying drawings in which.

DETAILED DESCRIPTION OF THE PREFERRED EMBODIMENT

Figure 1:
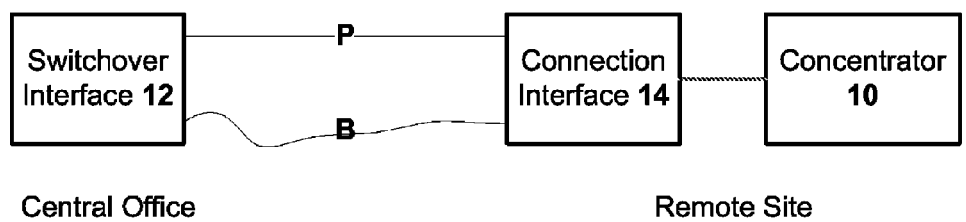
FIG. 1 is a block diagram illustrating basic functional operation in accordance with an embodiment of the present invention.

FIG. 1 is a block diagram illustrating basic functional operation in accordance with the present invention. In this case, a central office communicates with a remote site containing a concentrator 10 serving a multiplicity of customers, the central office being connected to the remote site via a fiber-optic, primary link P. For example, in a passive optical network, the link P might extend from an optical line terminal at the central office to a splitter in a neighborhood, where it is split into multiple fibers serving different customers. The splitter is inside concentrator 10, as is an upstream combiner utilizing TDMA, for example, to combine the signals on the customers' fibers.

In accordance with one aspect of the present invention, a switchover interface 12 is provided at the central office downstream of the optical line terminal, and primary link P is connected to it. The opposite end of primary link P (at the remote site) is connected to a connection interface 14 and, therefrom, to concentrator 10. A backup link B is also connected between switchover interface 12 and connection interface 14. The function of connection interface 14 is to transfer to concentrator 10 the signal from link P or link B, whichever happens to be active carrying traffic. The function of switchover interface 12 is to facilitate transfer between the primary and backup links. In the illustrative example, these two links are assumed to be in different fiber-optic cables, requiring switching between cables. However, it is also contemplated that switchover can take place between two optical links in the same cable.

In operation, when primary link P is setup, or if either link is ever replaced, all of the parameters associated with both links are stored, being computer first where necessary, locally at the central office. This would, for example, include the delay associated with each link and appropriate interface device settings for each link (e.g. the change in gain of interface amplifiers to compensate for the change in attenuation of the link, encryption keys, etc.) Switchover interface 12 could, for example, have redundant interface devices, separate ones set up to be operational with link P and link B. It could also have appropriate delay buffers set up to compensate for the differences in delay between the two links. Thus, when failure or impending failure of link P is sensed at the central office, and switchover interface 12 is caused to switch from link P to link B, the interface for link B would already be set up (in a standby mode), and it would only be necessary to activate the interface and make appropriate use of buffering.

For example, if the transmission delay difference between the two links were T, it would only be necessary to buffer the amount of information received during the interval T. Specifically, if link B had a greater delay, a buffering delay T would be used initially and would be removed upon switchover. On the other hand, if link B had a smaller delay, the buffering of that link would already be in place and the buffered signal would be used upon switchover.

Once link B is connected, control information is sent downstream to the remote equipment informing it of changes that need to be made owing to the change in the link. For example, the remote equipment might be instructed to change its transmission level to assure that the signal received by the central office is in an amplitude range that can be handled by the new interface. Similarly, it might be instructed to change its timings to keep the signal received by the central office in a timing range it can handle.

Since adequate processing capability would always be available at the central office, in its simplest form, interface 12 would need little processing capability. It need only have connections for the two links, a connection to the central office (not shown), electronics to switch link P or link B to connection 13, and the optical interfaces and the buffering. It could also contain memory to store the parameters for the two links, preferably in a non-volatile form. All major control could be exercised from outside interface 12.

Figure 2:
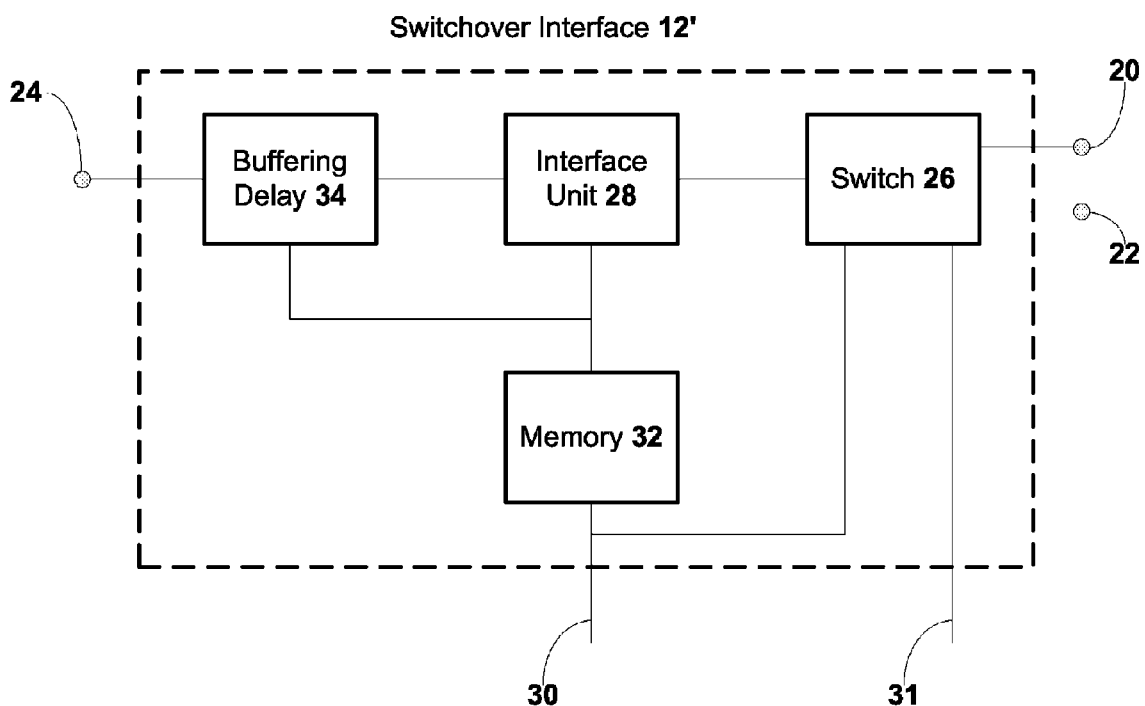
FIG. 2 is a block diagram schematically illustrating a first embodiment of the switchover interface in accordance with the present invention.

FIG. 2 is a block diagram schematically illustrating a first embodiment 12' of the switchover interface. Interface 12' has a connection 20 for primary link P, a connection 22 for backup link B, and a connection 24 to the central office. An externally controlled switch 26 is connected to connections 20 and 22. Its function is to connect one of the connections to an interface unit 28, under control of a control signal on lead 30 provided from the central office when a switchover is necessary. The control signal is also provided to a memory unit 32, which stores parameters associated with the interface required for the signal from switch 26. Those parameters are applied to and control an interface unit receiving the signal from switch 26 and a buffering delay unit 34 receiving the signal from interface unit 28. The parameters and the resulting interface will typically be different for connection 20 and connection 22, being established in advance, and dependent on the characteristics of the link connected to the connections 20, 22. Memory 32 also provides control information to buffering delay unit 34. This information, also established in advance, based upon the links connected to connections 20 and 22, will determine whether a buffering delay is present or absent and the amount of the delay.

In operation, memory 32 will normally apply control information appropriate for primary link P. When signal 30 indicates that switchover is necessary, memory 32 will output information appropriate for backup link B, changing the interface unit and buffering delay accordingly. Communication with the central office via connection 24 will therefore have the correct levels and timing, regardless of the switchover. Typically, the information in memory 32 will be determined whenever there is a change in the links connected to connections 20, 22.

Once switchover has taken place, switch 26 provides a signal on lead 31 confirming the switchover. The central office then sends control information downstream to the remote equipment, indicating interface and communication changes which need to be effected in upstream communications owing to the differences between characteristics of link P and link B. For example, the control information might cause a change in the upstream signal level to compensate for differences in attenuation between links P and B, or it might cause a change in the timing of the upstream signal to compensate for changes in signal delay caused by differences in the length of link P and B.

Figure 3:
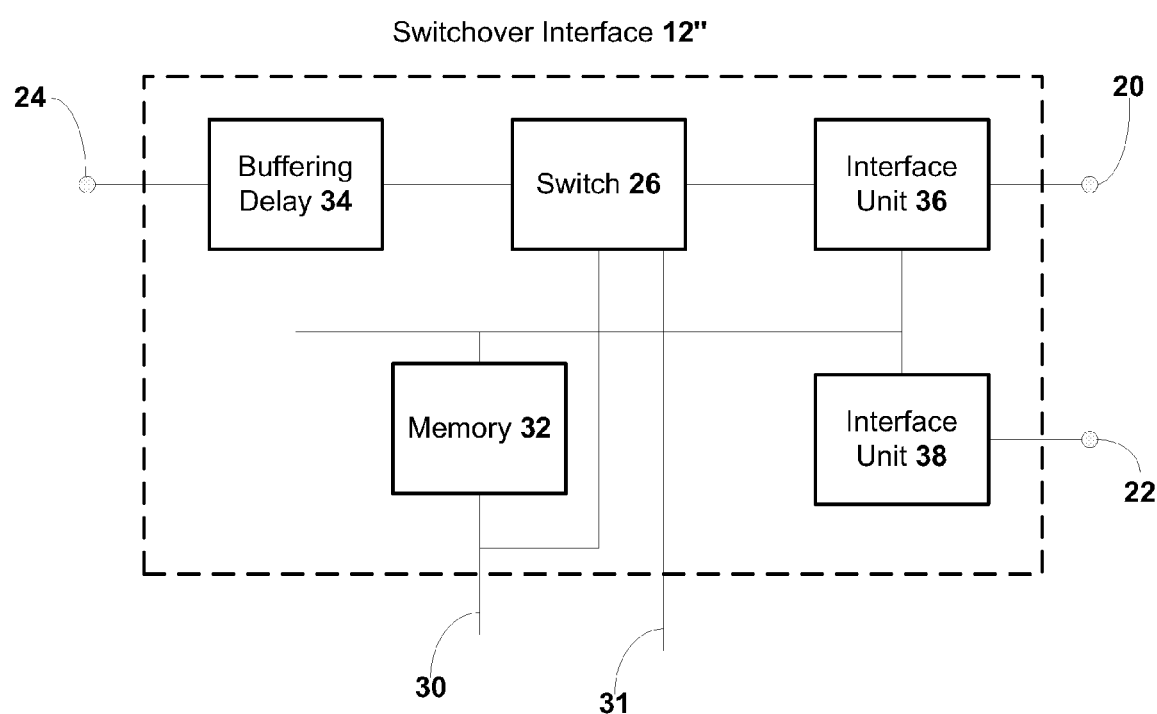
FIG. 3 is a block diagram schematically illustrating a second embodiment of the switchover interface in accordance with the present invention.

FIG. 3 is a block diagram schematically illustrating a second embodiment 12" of the switchover interface. Interface 12" has a connection 20 for primary link P, a connection 22 for backup link B, and a connection 24 to the central office. An externally controlled switch 26 is connected to connections 20 and 22 through a respective one of interface units 36 and 38. The function of control switch 26 is to connect one of the interface units 36, 38 to the buffering delay unit 34, under control of a control signal on lead 30 provided from the central office when a switchover is necessary.

The control signal is also provided to a memory unit 32, which stores parameters associated with the interface required for each of links P and B and that information is provided to units 36, 38 to set them up properly. The parameters and the resulting interfaces will typically be different for units 36 and 38, being established in advance, dependent on the characteristics of the link connected to the connections 20, 22. Memory 32 also provides control information to buffering delay unit 34. This information, also established in advance, based upon the links connected to connections 20 and 22, will determine whether a buffering delay is present or absent and the amount of the delay. Typically, the information in memory 32 will be determined whenever there is a change in the links connected to connections 20, 22.

Once switchover has taken place, switch 26 provides a signal on lead 31 confirming the switchover. The central office then sends control information downstream to the remote equipment, indicating interface and communication changes which need to be effected in upstream communications owing to the differences between characteristics of link P and link B. For example, the control information might cause a change in the upstream signal level to compensate for differences in attenuation between links P and B, or it might cause a change in the timing of the upstream signal to compensate for changes in signal delay caused by a differences in the length of link P and B.

In operation, memory 32 will apply control information appropriate for each link to the respective interface unit, keeping each unit ready for use. When signal 30 indicates that switchover is necessary, memory 32 will output information appropriate for backup link B, changing the buffering delay accordingly. Communication with the central office via connection 24 will therefore have the correct levels and timing, regardless of the switchover.

Figure 4:
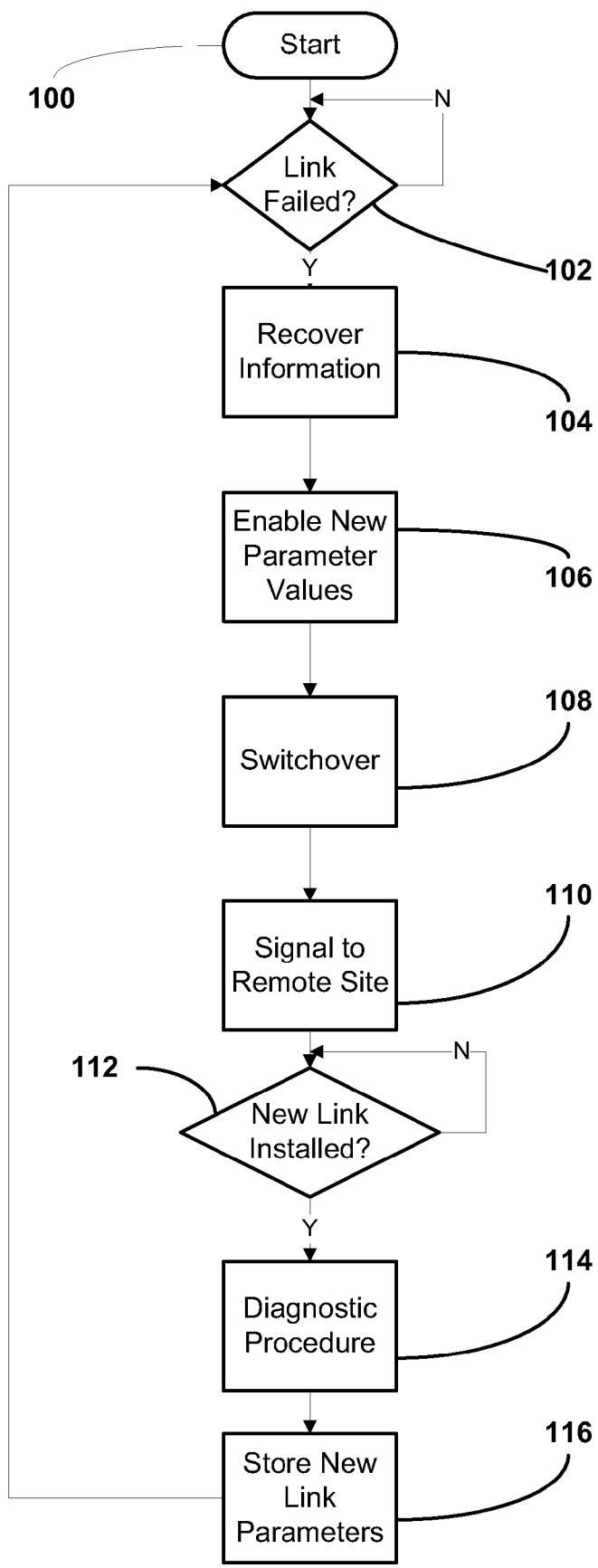
FIG. 4 is a block diagram illustrating a preferred process performed at switchover interface to achieve switchover operation in accordance with the present invention.

FIG. 4 is a block diagram illustrating a preferred process performed at switchover interface 12 to achieve switchover operation in accordance with the present invention. The process begins at block 100, and at block 102 a test is performed to determine whether an alarm has been received indicating that the optical link currently in use at switchover interface 12

(the primary link) is failing. Upon the occurrence of such a failure alarm, control transfers to block 104, where backup link information is recovered.

If such information is stored locally in interface 12, it may simply be read from local memory 32 and the appropriate adjustments made, such as enabling new interface values and enabling new parameters (block 106). The actual switchover is enabled at block 108. Thereafter, switchover interface 12 signals the remote equipment (a control signal) that switchover has taken place (block 110). This will cause the remote equipment to initiate any procedures that might be necessary to adjust timing or power level for upstream communication to compensate for the differences in operating characteristics between links P and B, or to undertake procedures related to updating encryption keys or error correction codes, and communications are restored, making use of the backup link.

Control then transfers to block 112 to await notification when a new optical link has been installed to replace the failed link, or that the failed link has been restored. Upon receipt of such notification, control transfers to block 114, where diagnostic procedures are performed on the newly installed link. Basically, these are just steps taken by the system (or persons installing a new cable or repairing the old one) to derive the parameters associated with the new link. Those parameters are then stored in local memory or memory available to switchover interface 12. At block 116, some time after the switchover itself, the backup link is defined as the primary link and the new link is defined as the backup link, and control reverts to block 102 to await another link failure.

Although preferred embodiments of the invention have been disclosed for illustrative purposes, those skilled in the art will appreciate that many additions, modifications and substitutions are possible without departing from the scope and spirit of the invention as defined by the accompanying claims.

What is claimed:

1. In a fiber-optic communications system in which a central office is connected to a remote site through a primary optical link, a method for ensuring continuity of communications between the central office and remote site, comprising the steps of:
    providing a backup optical link connected between the central office and remote site in parallel with the primary link, ready for use, such that a switchover may take place readily between the two links;
    connecting the backup link in place of the primary link upon failure of the primary link; and
    sending control information from the central office to the remote site to cause changes in the remote site signal to the central office which compensate for differences in the characteristics of the primary and backup links.

2. The method of claim 1 wherein the primary and backup links are in a common cable.

3. The method of claim 1 wherein the connecting step is performed automatically by a switchover interface at the central office, upon detection of failure of the primary link, both links being connected to the switchover interface, the switchover interface being controlled by control means at the central office.

4. The method of claim 3 wherein information associated with characteristics of the primary link or the backup link is stored so as to be accessible to the switchover interface.

5. The method of claim 4 wherein the information is stored in the switchover interface in non-volatile form.

6. The method of claim 5 wherein the information is associated with interface characteristics of one of the links.

7. The method of claim 5 wherein the information is associated with signal delay characteristics of one of the links.

8. The method of claim 1 wherein the connecting step is performed under control of control means at the central office.

9. The method of claim 8 wherein stored information associated with characteristics of the primary link or the backup link is utilized during the connecting step.

10. The method of claim 9 wherein the information is associated with interface characteristics of one of the links.

11. The method of claim 9 wherein the information is associated with signal delay characteristics of one of the links.

12. The method of claim 1 wherein one of the changes in the remote site signal to the central office is a change in its amplitude which compensates for a difference in attenuation between the primary and backup links.

13. At a central office connected to a remote site through a primary optical link, the combination of
    a switchover interface unit for use in a fiber-optic communications system in which, the switchover interface to ensure continuity of communications between the central office and remote site and comprising:
    a primary connection for the primary optical link;
    a backup connection for a backup optical link;
    a connection to the central office;
    a control signal input; and
    switching means responsive to a signal on the control signal input to selectively switch the primary connection and the secondary connection to the connection to the central office; with
    means at the central office responsive to switching of the switching means to send control information to the remote site to cause changes in a remote site upstream signal to the central office which compensate for differences in the characteristics of the two links.

14. The combination of claim 13 further comprising primary and backup interface modules connected, respectively, primary and backup connections, the primary and backup connections being connected to the switching means through the primary and backup interface modules, respectively.

15. The combination of claim 14 wherein the interface modules are under control of information in a memory available to the switchover interface.

16. The combination of claim 15 wherein the storage is in the switchover interface.

17. The combination of claim 16 wherein the storage is non-volatile.

18. The combination of claim 13 further comprising an interface module interposed between the switching means and the central office under control of information in storage available to the switchover interface the information controlling the interface depending on whether the switching means connects the primary link or the backup link to the central office.

19. The combination of claim 13 wherein the control information is configured to cause the remote site signal to the central office to be changed in amplitude to compensates for a difference in attenuation between the primary and backup links.

20. The combination of claim 13 wherein the control information is configured to cause the remote site signal to the central office to be changed in timing to compensates for a difference in delay between the primary and backup links.

* * * * *